United States Patent
Langer et al.

(10) Patent No.: US 6,460,934 B1
(45) Date of Patent: Oct. 8, 2002

(54) ELECTRIC ADJUSTING DEVICE FOR A FRONT SEAT OF A MOTOR VEHICLE

(75) Inventors: Jochen Langer, Tübingen; Peter Maly, Eutingen im Gäu; Frank Rauscher, Pliezhausen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/633,181

(22) Filed: Aug. 4, 2000

(30) Foreign Application Priority Data

Aug. 20, 1999 (DE) .......................................... 199 39 183

(51) Int. Cl.$^7$ ................................................. A47C 1/02
(52) U.S. Cl. ................................ 297/463.1; 297/344.1; 297/377
(58) Field of Search ............................... 297/463.1, 391, 297/284.6, 284.9, 378.12, 216.12, 216.13, 216.14, 216.15, 216.16, 33, 378.14, 330, 344.1, 344.3, 362.1, 378, 379, 329; 296/64, 65.1

(56) References Cited

U.S. PATENT DOCUMENTS

| | | | | |
|---|---|---|---|---|
| 4,326,690 A | * | 4/1982 | Pickles | 297/327 |
| 4,765,582 A | * | 8/1988 | Babbs | 297/346 |
| 4,852,934 A | * | 8/1989 | Yasuda | 297/257 |
| 4,925,228 A | * | 5/1990 | Pipon | 297/329 |
| 5,179,328 A | * | 1/1993 | Furuse | 318/603 |
| 5,344,204 A | * | 9/1994 | Yunzhao | 297/216.1 |
| 5,483,853 A | * | 1/1996 | Moradell | 297/362.11 |
| 5,528,959 A | * | 6/1996 | Yamakami | 297/330 |
| 5,876,096 A | * | 3/1999 | Yamakami | 297/344.13 |
| 5,975,637 A | * | 11/1999 | Geuss | 297/391 |
| 6,042,145 A | * | 3/2000 | Mitschelen | 280/735 |
| 6,132,000 A | * | 10/2000 | Tanaka | 297/378.13 |
| 6,220,667 B1 | * | 4/2001 | Wagner | 297/391 |
| 6,234,575 B1 | * | 5/2001 | Schuler | 297/344.1 |
| 6,244,660 B1 | * | 6/2001 | Yoshimatsu | 297/344.1 |
| 6,255,790 B1 | * | 7/2001 | Popp | 318/280 |

FOREIGN PATENT DOCUMENTS

| | | |
|---|---|---|
| DE | 4034529 A1 * | 5/1992 |
| DE | 4315472 A1 * | 11/1994 |
| DE | 196 30 322 A 1 | 1/1997 |
| DE | 196 30 223 A 1 | 1/1998 |

* cited by examiner

*Primary Examiner*—Beth A. Stephan
(74) *Attorney, Agent, or Firm*—Crowell & Moring LLP

(57) ABSTRACT

An electric adjusting device for a front seat of a motor vehicle, with which the front seat can be displaced at least in the longitudinal direction by means of an electric motor is provided. In the present invention, a forwards displacement of the front seat is requested by folding the seat back forwards (entry assistance). According to the invention, a changeover switch which is coupled to the release lever is provided. The changeover switch having to be actuated at the same time as the seat back is folded forwards, if it is intended for the seat to be displaced by means of an electric motor in order to facilitate entry.

19 Claims, 1 Drawing Sheet

ELECTRIC ADJUSTING DEVICE FOR A FRONT SEAT OF A MOTOR VEHICLE

BACKGROUND OF THE INVENTION

1. Field of the Invention

The invention relates to an electric adjusting device for a front seat of a motor vehicle, and more particularly to, an electric device for a front seat of a motor vehicle which causes a forward displacement of the front seat in response to folding the seat back forwards.

2. Description of the Related Art

DE 196 30 223 A1 discloses an adjusting device of the generic type in which the front seat can be adjusted by means of electric servomotors.

In the case of the adjusting devices which have been mentioned, an auxiliary device is provided for the forwards displacement of the front seat into an entry position and rearwards displacement into a rearwards-displacement position, as required. The entry and access to the rear seats in the case of two-door vehicles is intended to be facilitated by such an auxiliary device (easy-entry function, entry assistance). The known auxiliary device is concerned with front seats which are constructed from a seat lower part, which can be adjusted in the longitudinal direction by means of an electric motor, with a pivotable seat backrest. For this purpose, a release lever is provided on the seat back, which is used, in the release position, to release the seat back mechanically and enable it to fold forwards. When the seat backrest is pivoted forwards, an electric memory means retains the current position of use. The auxiliary device then moves the front seat forwards into the entry position enabling easy access to the rear seats. When the seat backrest is pivoted back, the front seat moves into a rearwards-displacement position which corresponds, for example, to the stored starting position.

In the event of the front seat having been set to a position situated comparatively far to the rear, there is the risk of a rear occupant becoming stuck when the front seat is displaced rearwards into the stored starting position. In order to prevent this, in German Patent Document DE 196 30 223 A 1, a blocking function is provided which restricts the rearwards displacement of the front seat to a maximum rearwards-displacement position.

However, in everyday use the rear seats are very frequently only used to store objects, for example a briefcase. In these cases, the restriction of the rearwards displacement is not required and for a large person sitting on the front seat is even undesirable, since the restriction has to be re-recorded each time by manual intervention.

Therefore, in German Patent Document DE 196 30 223 A 1, provision is made for a restriction of the rearwards displacement of the front seat, and the losses of comfort associated therewith for a large, front occupant, only to take place if the rear seat is actually also occupied b an occupant. This is determined by means in the rear seat arranged behind the front seat.

A disadvantage of this solution is the comparatively great outlay. It would furthermore be desirable if a user could control the extent of the forwards displacement and rearwards displacement of the front seat individually without therefore using the seat-adjustment operating unit which can normally only be operated comfortably from the front seats.

The object of the invention is to improve an electric adjusting device of the generic type for a front seat of a motor vehicle to the effect that the displacement of the front seat in the longitudinal direction for a user entering the vehicle can be controlled individually.

The present invention is aimed at one or more of the problems identified above.

BRIEF SUMMARY OF THE INVENTION

According to the invention, the front seat is only displaced forwards by means of an electric motor if, after release of the seat back, the seat back has been folded forwards and at the same time the release lever is also actuated in the release position. If the desired position has been reached, the forwards displacement can be halted by returning the release lever into the neutral position. It is therefore possible only to move the seat as far forwards as is absolutely necessary, for example in order to place an attache case into the footwell in front of the rear seat.

If, in order to place an attache case onto the rear seat, only the seat back is to be folded over, a forwards displacement of the front seat can be suppressed by means of an appropriate manipulation. For this purpose, immediately after the release of the seat back the release lever has to be returned into the neutral position before the seat-back switch is actuated by the folding forwards of the seat back.

In one aspect of the present invention, the seat-back switch is arranged in such a manner that it is actuated as late as possible when the seat back has been folded forwards into the end position.

In another aspect of the present invention, a rearwards displacement of the front seat can be requested by pressing down the release lever beyond the neutral position, the rearwards displacement being possible, depending on the design in each case, irrespective of the angle of the seat back or only when the seat back is folded back into the position of use.

Further details and advantageous developments of the adjusting device according to the invention emerge from the other subclaims in conjunction with the following description.

DETAILED DESCRIPTION OF THE INVENTION

Figure 1:
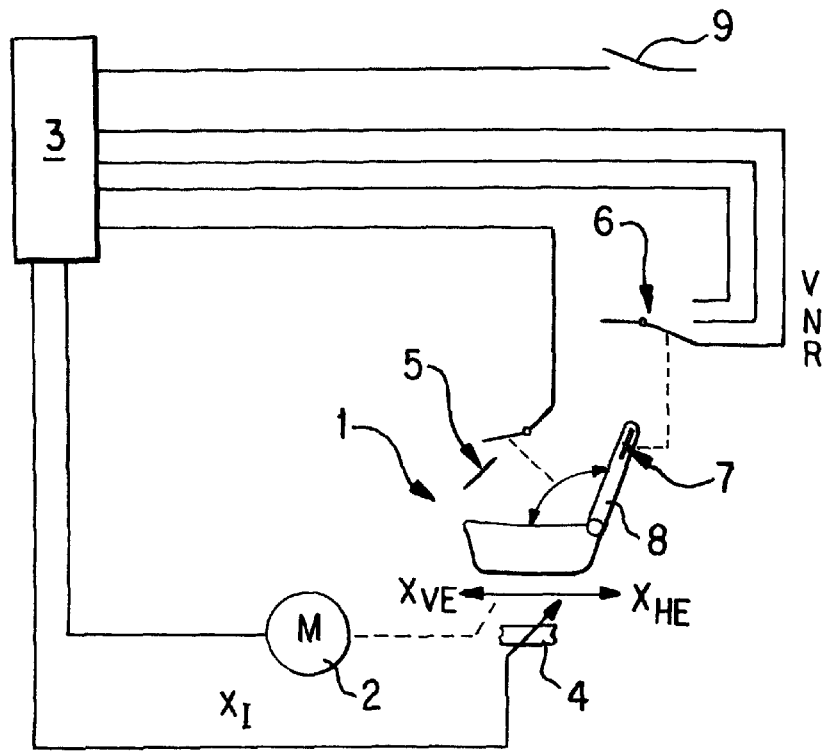
FIG. 1 shows an electric adjusting device according to the invention.

In the exemplary embodiment illustrated in FIG. 1, a front seat 1 can be displaced by an electric adjusting device 2–4 in the longitudinal direction between a front and position $X_{VE}$ and a rear end position $X_{HE}$ by means of a servomotor 2. The adjusting device 2–4 comprises a control unit 3 which activates the servomotor 2 if the front seat 1 is to be displaced forwards or rearwards. The actual value $X_I$ of the longitudinal position of the front seat 1 is detected by a displacement indicator 4, for example a potentiometer, and passed to the control unit 3. Using the control circuit formed in this manner, a predetermined desired position can be arrived at precisely.

The desired position which is to be arrived at is predetermined as a function of different request conditions. In particular, the control unit 3 can be set into an entry-assisting operating mode in which the front seat 1 is displaced forwards into an entry position. The entry to a rear seat (not illustrated) arranged behind the front seat is facilitated as a result.

In order to request the forwards displacement, a seat-back switch 5 is provided which activates the control unit 3 and which can be actuated by folding the seat back 8 of the front seat 1 forwards. The seat-back switch 5 is preferably arranged in such a manner that it is only actuated if the seat back 8 has been folded forwards as far as the end position or shortly before it. This corresponds approximately to an angle of above 50°.

According to the invention, the control unit 3 is additionally activated by a changeover switch 6 having at least one forwards-displacement position V and a neutral position N. The changeover switch 6 is coupled to the release lever 7 which is provided on the seat back 8. If the release lever 7 is brought into the release position, the seat back 8 is then released mechanically, which enables it to fold forwards. At the same time, during the transfer into the release position, the changeover switch 6 is brought into the forwards-displacement position V.

According to the invention, in order to request the forwards displacement and displacement of the front seat 1 into the entry position by means of an electric motor, not only does the seat-back switch 5 have to be actuated, by folding the seat back 8 forwards, but also the changeover switch 6 has to be brought into the forwards-displacement position V by actuation of the release lever 7.

Movement of the seat forwards is terminated if the release lever 7 and therefore the changeover switch 6 are brought into the neutral position N. It is ergonomically advantageous if an automatic return into the neutral position N is provided for the release lever 7 and the changeover switch 6. The forwards displacement of the front seat 1 can then be terminated at a desired point by letting go of the release lever 7.

Alternatively, a latching forwards-displacement position can be provided for the changeover switch 6, with which, by latching it into the forwards-displacement position, the forwards displacement into a predetermined entry position can be requested, as is provided in DE 196 30 223 A1. A forwards-displacement procedure can be terminated by manual intervention, by bringing the release lever 7 back manually into the neutral position.

Provision may furthermore be made for a forwards displacement also to be able to depend on other conditions, for example on the position of a door-contact switch 9 on the entry side to the seat 1. It can therefore, for example, be stipulated that a forwards displacement of the front seat 1 is only initiated if at the same time the door on the entry side is opened.

In order to displace the front seat 1 rearwards, provision may be made for the rearwards displacement into a rearwards-displacement position to be able to be requested, following a forwards displacement, solely by pivoting back the seat back 8 and in the neutral position of the release lever 7. The rearwards-displacement position can be a previously stored position of use or can be restricted as a function of the associated rear seat being occupied, as described in DE 196 30 223 A1.

In an advantageous development, provision is made for a rearwards-displacement position R to be provided below the neutral position of the release lever 7 and, correspondingly, of the changeover switch 6. The changeover switch 6 can therefore be brought into the rearwards-displacement position R by pressing down the release lever 7 beyond the neutral position. The control unit 3 then activates the servomotor 2 in such a manner that the front seat 1 is displaced to the rear. If the release lever 7 is brought into the neutral position, the rearwards-displacement procedure is terminated. Provision may also be made here of an automatic return of the release lever 7 or of a latching rearwards-displacement position, in each case having the same function as in the forwards displacement and optional restriction, as described in DE 196 30 223 A1.

A design in which the actuation of the release lever 7 is sufficient on its own in order to request the rearwards displacement has the advantage that, when the front seat 1 is moved back, the seat back 8 can remain folded forwards, which opens up the view to the footwell in front of the rear seat and therefore offers better visual checking.

Alternatively, it is also conceivable that, in order to request the rearwards displacement by means of the release lever 7, the seat back 8 has additionally to be pivoted back again into the position of use.

A combination is also conceivable in which, with the seat back 8 pivoted forwards, the rearwards displacement can be controlled individually by means of the release lever 7, and with the seat back 8 pivoted back, the seat 1 is moved back into a predetermined rearwards-displacement position which can be predetermined, for example as described in DE 196 30 223 A1.

An advantageous development consists in the fact that, if a longitudinal adjustment of the front seat 1 is requested, by means of the actuation of the release lever 7, the adjusting motor 2 is activated in such a manner that this adjustment takes place at a higher speed, for example three times as rapidly, than the normal comfort adjustment via the known operating unit (not illustrated) which is comfortably accessible from the front seat 1. This is possible because it can generally be assumed that in the case of an adjustment requested by means of the release lever 7, the front seat 1 is unoccupied. The lower weight to be displaced therefore permits the available power of the adjusting motor 2 to be used in order to displace the seat 1 more rapidly. Therefore, a rapid movement of the seat forwards or back, initiated by pulling or pressing the release lever 7, can be brought about, as is desirable if the intention is only to facilitate the access to the rear seats.

A development building on this consists in the fact that the adjustment at an increased speed only takes place if at the same time the door-contact switch 9 indicates an opened door. It is therefore ensured that the adjustment actually serves to facilitate entry and that the front seat 1 is unoccupied.

Figure 2:
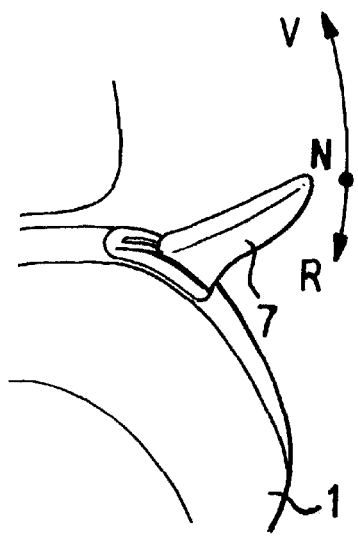
FIG. 2 shows the release lever with three actuating positions.

In FIG. 2, the enlarged detail of the front seat 1 having the actuating lever 7 is illustrated, as is used for the function according to the invention of facilitating entry (easy-entry function). The switch positions V, N, R of the changeover switch 6 correspond to the three positions of the release lever 7 (pulling, zero position, pressing).

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. An electric adjusting device for a front seat of a motor vehicle, with which the front seat can be displaced at least in the longitudinal direction by means of an electric motor, comprising:

a control unit which can be set, by a seat-back switch which is actuable by folding the seat back forwards, into an entry-assisting operating mode in which the front seat is displaced forwards into an entry position, a release lever being provided on the seat back, which is used, in a release position, to release the seat back mechanically and enable it to fold forwards, a changeover switch having at least one forwards-displacement position V and a neutral position N, wherein the changeover switch is coupled to the release lever in such a manner that the release lever is in the release position, the changeover switch is located in the forwards-displacement position V, and wherein the control unit can be additionally activated by the changeover switch and wherein not only the seat-back switch has to be actuated, by folding the seat back forwards, but also the changeover switch has to be located in the forwards-displacement position V, in order to displace the front seat into the entry position by means of the electric motor.

2. An electric adjusting device, as set forth in claim 1, wherein the seat-back switch is arranged in such a manner that the seat-back switch is only actuated if the seat back has been folded forwards near an end position.

3. An electric adjusting device, as set forth in claim 1, wherein the changeover switch also has a rearwards-displacement position R into which the changeover switch can be brought by pressing down the release lever beyond the neutral position N, at least the changeover switch having to be located in the rearwards-displacement position R in order to displace the front seat rearwards.

4. An electric adjusting device, as set forth in claim 3, wherein the seat back additionally has to be folded back in order to displace the front seat rearwards.

5. An electric adjusting device, as set forth in claim 3, wherein if a longitudinal adjustment of the front seat is requested, by actuating the release lever, the electric motor is activated in such a manner that this adjustment of the front seat takes place at a higher speed than the normal comfort speed.

6. An electric adjusting device, as set forth in claim 5, wherein the adjustment at an increased speed only takes place if at the same time a door-contact switch indicates an opened door.

7. An electric adjusting device for adjusting a front seat of a motor vehicle by means of an electric motor, the front seat having a seat back, the electric adjusting device comprising:

a seat-back switch that can be actuated by folding the seat back forward; and a release lever having a release position and a neutral position, wherein the front seat is moved forward when the release lever is placed and held in the release position and when the seat-back switch is actuated by folding the seat back forward.

8. The device of claim 7, wherein the release lever has a rearward-displacement position, and in order to move the front seat rearwards, the release lever must be in the rearward-displacement position.

9. The device of claim 8, wherein the front seat is moved rearwards when the seat back is folded back and when the release lever is placed and held in the rearward-displacement position.

10. The device of claim 9, wherein the front seat is moved rearwards at a speed higher than a normal comfort speed when the seat back is folded back and when the release lever is placed and held in the rearward-displacement position.

11. The device of claim 10, wherein the front seat is moved rearwards at a speed higher than a normal comfort speed only when a door-contact switch indicates the driver-side front door is open.

12. The device of claim 7, wherein the front seat is moved forward at a speed higher than a normal comfort speed when the release lever is placed and held in the release position and when the seat-back switch is actuated by folding the seat back forward.

13. The device of claim 12, wherein the front seat is moved forward at a speed higher than a normal comfort speed only when a door-contact switch indicates the driver-side front door is open.

14. A method for adjusting a front seat of a motor vehicle by means of an electric motor, the front seat having a seat back, the method comprising:

moving the front seat forward by folding the seat back forward to actuate a seat-back switch and by placing and holding a release lever in a release position.

15. The method of claim 14 further comprising:

moving the front seat rearwards by folding the seat back back and by placing and holding a release lever in a rearward-displacement position.

16. The method of claim 15, wherein moving the front seat rearwards includes moving the front seat rearwards at a speed higher than a normal comfort speed.

17. The device of claim 16, wherein moving the front seat rearwards at a speed higher than a normal comfort speed when a door-contact switch indicates the driver-side front door is open.

18. The method of claim 14, wherein moving the front seat forward includes moving the front seat forward at a speed higher than a normal comfort speed.

19. The method of claim 18, wherein moving the front seat forward at a speed higher than a normal comfort speed when a door-contact switch indicates the driver-side front door is open.

* * * * *